United States Patent
Coppola et al.

(10) Patent No.: US 11,781,075 B2
(45) Date of Patent: Oct. 10, 2023

(54) HYDROTHERMAL PURIFICATION PROCESS

(71) Applicant: Applied Research Associates, Inc., Albuquerque, NM (US)

(72) Inventors: Edward N. Coppola, Southport, FL (US); Sanjay Nana, Panama City, FL (US); Charles Red, Jr., Youngstown, FL (US); Jocelyn Marie Goodwin, Panama City, FL (US)

(73) Assignee: Applied Research Associates, Inc., Albuquerque, NM (US)

( * ) Notice: Subject to any disclaimer, the term of this patent is extended or adjusted under 35 U.S.C. 154(b) by 10 days.

(21) Appl. No.: 17/398,082

(22) Filed: Aug. 10, 2021

(65) Prior Publication Data

US 2022/0049167 A1 Feb. 17, 2022

Related U.S. Application Data (60) Provisional application No. 63/064,234, filed on Aug. 11, 2020.

(51) Int. Cl.
*C10G 49/18* (2006.01)
*C10G 49/20* (2006.01)
*C10G 49/22* (2006.01)
*C10G 49/26* (2006.01)

(52) U.S. Cl.
CPC .............. *C10G 49/20* (2013.01); *C10G 49/26* (2013.01); *C10G 2300/201* (2013.01); *C10G 2300/805* (2013.01)

(58) Field of Classification Search
CPC ........ C10G 49/18; C10G 49/20; C10G 49/22; C10G 49/26; C10G 2300/201; C10G 2300/805
See application file for complete search history.

(56) References Cited

U.S. PATENT DOCUMENTS

| | | | |
|---|---|---|---|
| 5,492,634 A | 2/1996 | Hong et al. | |
| 6,066,263 A | 5/2000 | Makino et al. | |
| 6,399,802 B2 | 6/2002 | Reaney | |
| 6,475,396 B1 | 11/2002 | Wofford et al. | |
| 6,506,308 B1 | 1/2003 | Rolf | |
| 7,399,408 B2 | 7/2008 | Joussot-Dubien et al. | |
| 7,691,159 B2 | 4/2010 | Li | |
| 8,686,198 B2 | 4/2014 | Kalnes | |
| 8,815,081 B2 | 8/2014 | Choi | |
| 9,024,096 B2 | 5/2015 | Greene | |
| 9,162,938 B2 | 10/2015 | Mukherjee et al. | |
| 10,071,322 B2 | 9/2018 | Coppola et al. | |
| 2003/0045655 A1 | 3/2003 | Hendriksen et al. | |
| 2004/0129646 A1 | 7/2004 | Conaway et al. | |
| 2007/0056879 A1 | 3/2007 | Euzen et al. | |
| 2007/0056881 A1 | 3/2007 | Berkowitz et al. | |
| 2009/0166261 A1 | 7/2009 | Li et al. | |
| 2009/0166262 A1 | 7/2009 | He et al. | |
| 2010/0028236 A1 | 2/2010 | Shen et al. | |
| 2010/0294696 A1 | 11/2010 | Tanaka et al. | |
| 2010/0300933 A1 | 12/2010 | Tanaka | |
| 2011/0252696 A1 | 10/2011 | Franklin et al. | |
| 2011/0315600 A1 | 12/2011 | Choi et al. | |
| 2012/0073184 A1 | 3/2012 | Cranford et al. | |
| 2012/0181217 A1 | 7/2012 | Choi et al. | |
| 2012/0190872 A1 | 7/2012 | Cranford et al. | |
| 2013/0134351 A1 | 5/2013 | Bathurst | |
| 2013/0137154 A1 | 5/2013 | Reep | |
| 2014/0109465 A1 | 4/2014 | Coppola et al. | |
| 2014/0163272 A1 | 6/2014 | Mukherjee et al. | |
| 2014/0251871 A1 | 9/2014 | Choi et al. | |
| 2014/0305031 A1 | 10/2014 | Day et al. | |
| 2015/0126758 A1 | 5/2015 | Elliott et al. | |

(Continued)

FOREIGN PATENT DOCUMENTS

| | | |
|---|---|---|
| JP | 2002-155286 A | 5/2002 |
| WO | 2006/010068 A1 | 1/2006 |

(Continued)

OTHER PUBLICATIONS

King et al., "Hydrolysis of soybean oil in a subcritical flow reactor", Green Chemistry, 1999, p. 261-264, The Royal Society of Chemistry, Nov. 1999.

*Primary Examiner* — Randy Boyer
(74) *Attorney, Agent, or Firm* — Erise IP, P.A.

(57) ABSTRACT

A process and system for reducing contaminants contained in a contaminated feedstock comprising mixing the contaminated feedstock with water and at least one of metal scavengers or reactants, to form a feedstock-water-reactant mixture, feeding the mixture under pressure into a hydrothermal purification reactor, wherein the mixture is subject to heat, pressure, and turbulent flow conditions to cause rapid reaction of the inorganic contaminants with the metal scavengers or reactants to form inorganic salts that partition into an aqueous phase and maintaining the temperature, pressure, and turbulent flow conditions of the feedstock-water-reactant mixture for a predetermined space time to prevent the organic portion of the feedstock in the mixture from undergoing a conversion reaction and to form a hydrothermal reactor effluent; and separating the effluent into the aqueous phase containing salts of the inorganic contaminants and an organic phase that contains a lower concentration of inorganic contaminants than the contaminated feedstock.

18 Claims, 2 Drawing Sheets

(56) References Cited

U.S. PATENT DOCUMENTS

| | | |
|---|---|---|
| 2015/0152336 A1 | 6/2015 | Greene |
| 2015/0203768 A1 | 7/2015 | Coppola et al. |
| 2015/0217265 A1 | 8/2015 | Greene |
| 2015/0329788 A1 | 11/2015 | Greene |
| 2016/0214028 A1* | 7/2016 | Coppola ............ B01D 17/0214 |
| 2017/0204349 A1 | 7/2017 | Kozyuk et al. |
| 2019/0203154 A1 | 7/2019 | Malm |
| 2020/0190426 A1* | 6/2020 | Bjorklof ................ C11B 13/00 |

FOREIGN PATENT DOCUMENTS

| | | |
|---|---|---|
| WO | 2014/066396 A1 | 5/2014 |
| WO | 2015/094948 A1 | 6/2015 |
| WO | 2015/181749 A1 | 12/2015 |

\* cited by examiner

HYDROTHERMAL PURIFICATION PROCESS

CROSS REFERENCE TO RELATED APPLICATIONS

This application claims benefit of priority from U.S. Provisional Patent Application No. 63/064,234, filed Aug. 11, 2020, which is incorporated herein by reference in its entirety.

FIELD OF THE INVENTION

The present invention is directed to rapid metals reduction of renewable feedstocks in combination with a hydrothermal purification (HTP) process and system for the reduction of inorganic and organic contaminants, such as salts, minerals, metals, and coke precursors in renewable oils. The process includes the step of combining the feedstock with at least one of metal scavengers and/or reactants, wherein the metal scavengers or reactants comprise salt or acid solutions, along with water, prior to or during feeding of the feedstock into a hydrothermal purification reactor. Conditions within the reactor are maintained to cause a reaction of the inorganic contaminates with the acid and/or salt scavengers while preventing the organic portion of the feedstock from undergoing conversion reactions such as polymerization or thermal cracking. The process and system is characterized by a very short residence time under turbulent flow and temperature and pressure controlled to maintain hydrothermal (saturated water) conditions.

BACKGROUND OF THE INVENTION

The ever-increasing demand for renewable fuels and chemicals has forced refineries to look to alternative hydrocarbon sources and ways to upgrade and convert these sources or feedstocks into viable products. In particular, refineries need processes to upgrade renewable feedstocks, such as plant oils, algal and microbial oils, waste vegetable oils, yellow and brown grease, tallow, soap stock, and pyrolysis oils from cellulose into high-value, light- and middle-distillate hydrocarbon products. Renewable, waste, and low-cost feedstocks often contain contaminants that must be removed collectively prior to upgrading by conventional refinery processes into clean hydrocarbon fuels or chemicals.

Renewable fats oils and greases typically contain phospholipid compounds or complexes, referred to herein as phospholipids. The phosphorous in phospholipids creates two primary problems for conventional refinery unit operations. First, phosphorus is a nucleating site and catalyst for coke formation. Renewable feedstocks that are high in phosphorus cause coking in fired-furnaces and heat exchangers, which greatly increases downtime for decoking and other maintenance operations. Second, phosphorus irreversibly poisons and deactivates catalysts used in hydrotreating, hydrocracking, and hydroisomerization, leading to more frequent and costly down time and catalyst replacement. Catalysts may be protected using guard beds containing alumina or similar high-surface area materials that can absorb low concentrations of metal and phosphorus compounds, but this approach is cost prohibitive for renewable oils containing high levels of phospholipids.

Renewable oils containing phospholipids may be chemically degummed to eliminate phosphorus. Phospholipids contain a diglyceride (two fatty acid chains covalently bonded to a glycerin molecule through ester linkages), a phosphate group ($PO_4^{3-}$), and are typically complexed with various organic molecules, such as choline ($C_5H_{14}NO$), ethanolamine, serine, inositol, and the like. Conventional chemical degumming uses phosphoric acid or citric acid to remove phospholipids as phosphatidic acid. Phosphatidic acid includes the two fatty acids and the glycerin backbone from the original phospholipid. Thus, conventional chemical degumming of a plant or algal oils that are high in phospholipid content results in significant yield loss because the entire phospholipid diglyceride is removed from the treated oil.

Processes for converting renewable oils into renewable, hydrocarbon fuels (as opposed to fatty acid methyl esters or FAME biodiesel) typically hydrotreat the triglyceride feedstock resulting in hydrogenolysis of the glycerin backbone. Partially due to the hydrogen that is required to hydrotreat the glycerin backbone, which produces propane, this process requires up to 100% more hydrogen than is required for fatty acid deoxygenation alone. Hydrolysis or "fat-splitting" processes may be used to produce glycerin and free fatty acids that are used for renewable fuel or chemical production. A widely employed hydrolysis process is the Colgate-Emery process.

The Colgate-Emery process is a continuous-flow, counter-current process that typically operates at 250-260° C. and 725 psig. Oil is fed into the bottom of a splitting tower and demineralized water is fed into the top of the tower. Fatty acids are discharged from the top of the tower and a water-glycerin solution (sweet water) is removed from the bottom of the tower. Processing time is 2 to 3 hours, which requires very large heated pressure vessels for large commercial applications. Several factors limit the performance of a Colgate-Emery process: 1) the need to operate below the glycerin decomposition temperature, which is approximately 290° C.; 2) the need to provide long residence time for hydrolysis and to permit gravity separation of free fatty acid and glycerin-water phases; 3) the need to use relatively clean, degummed feed stocks to prevent emulsion formation; and 4) the economical tradeoff between operating temperature, pressure, and residence time. Operation of the Colgate-Emery process at higher temperature requires higher pressure and risks decomposition of glycerin due to the long residence time at temperatures near 290° C. The large equipment required makes this process cost prohibitive for alternative fuel production due to the large volumes of oil that must be processed to achieve economic viability. Sweet water (a diluted solution of glycerin) may form an emulsion due to the presence of residual free fatty acids and partially hydrolyzed triglycerides. To recover the dilute glycerin product, sweet water typically must settle for up to 24 hours at 80-90° C. with demulsifying agents. Vacuum distillation may also be used to further separate long- and short-chain fatty acids.

Soap stocks are formed during refining of edible oils where sodium hydroxide is used to remove free fatty acids from plant oils as sodium soaps. Soap stocks contain sodium soaps as well as phospholipids. Worldwide large quantities of soaps stocks are produced. Because clean free fatty acids are much more valuable as feed stocks for biofuels production and other applications than soaps, acidulation using strong acids, such as sulfuric acid, is used to reverse the reaction at 90° C. to recover free fatty acids and sodium salts. In addition to the need for and use of a strong acid, the process results in the production of acidic effluents containing phospholipids and other compounds.

Plant oils, algal and microbial oils, waste vegetable oils, yellow and brown grease, tallow, and other lipids contain metals in the form of soaps of sodium, potassium, calcium, magnesium, iron, and other cations. These metals must be reduced to less than a few ppm to prevent coke formation and catalyst fouling in biofuels production processes. It can be appreciated that waste fats, oils, greases, phosphatide gums, soaps, and mixtures thereof can be in the form of mixtures and emulsions that impede or prevent conventional pretreatment operations.

SUMMARY OF THE INVENTION

The present invention is directed to a process and system for the hydrothermal cleanup of renewable feedstocks, such as plant oils, algal and microbial oils, waste vegetable oils, brown grease, yellow grease, tallow, poultry fat, distillers, corn oil, soap stocks, tall oils, and bio (pyrolysis) oils from cellulosic materials. This invention has numerous advantages over other cleanup processes such as chemical degumming, desalting processes, or other chemical, extraction, filtration, or thermal processes. Advantages include, but are not limited to: 1) equipment that exhibits a small footprint that can be co-located with a conventional petroleum refinery, or co-located with waste oil aggregators, or oil seed crushing facilities; 2) the ability to recover glycerin, fatty acids, or mono-, di-, and triglycerides; 3) the reduction of phosphorus, metals, and chlorine to less than 2 ppm; 4) the reduction of polyethylene: 5) the reduction of silicon: and 6) the elimination of solid wastes and associated increase in clean product yield due to recovery of fatty acids from phospholipids and metal soaps. The system is specifically desirable for use in processing unrefined or waste fats, oil, and greases including algal oils and tallows. At the turbulent flow, high Reynolds number conditions employed during hydrothermal purification, renewable oils and water become intimately mixed, which results in rapid mass transfer and conversion of soaps and other contaminants to salts that rapidly partition to the aqueous phase during oil-water separation. The addition of metal scavengers and/or reactants, wherein the metal scavengers and reactants comprise salt or acid solutions, along with water, prior to or during the feeding of the feedstock into the hydrothermal purification reactor accelerates reduction of metal contaminants to very low ppm levels. Conditions within the reactor are maintained to cause a reaction of the inorganic contaminates with the acid and/or salt scavengers while preventing the organic portion of the feedstock from undergoing conversion reactions such as polymerization or thermal cracking.

When used for metals reduction, such as for soap stocks or lipids containing metal soaps, the present invention accomplishes rapid acidulation without the need for a strong mineral acid. Because phospholipids are completely hydrolyzed during hydrothermal purification, clean lipid products are recovered. The diglyceride residual produced by the hydrolysis of phospholipids is not only recovered in the oil phase to improve yield, but oil and water phases can then be easily separated with no rag layer formation or residual effluent generation that is caused by the presence of phospholipids.

In accordance with one embodiment of the disclosure, a process for reducing contaminants contained in renewable feedstocks comprises providing at least one of metal scavengers or reactants, wherein the metal scavengers or reactants comprise acid or salt solutions, or a combination of acid and salt solutions. The process includes mixing the metal scavengers or reactants with water and the feedstock to form a feedstock-water-reactant mixture and feeding the feedstock-water-reactant mixture into a hydrothermal purification reactor, wherein the mixture is subject to heat, pressure, and turbulent flow conditions. The process further includes maintaining the temperature, pressure, and turbulent flow conditions of the feedstock-water-reactant mixture, in the hydrothermal purification reactor, in a manner that causes rapid reaction of the inorganic contaminants with the metal scavenger or reactants to form inorganic salts that partition into an aqueous phase. The process further includes maintaining the temperature, pressure, and turbulent flow conditions of the feedstock-water-reactant mixture in the hydrothermal purification reactor so as to prevent the organic portion of the feedstock in the mixture from undergoing thermal cracking of lipid carbon-carbon bonds into lower molecular weight fragments, polymerization into higher molecular weight hydrocarbons, and/or from undergoing isomerization of unsaturated compounds from the "cis-" isomer to the "trans-" isomer. Then, separating the hydrothermal purification reactor effluent into an aqueous phase containing salts of the inorganic contaminants and an organic phase, or resulting product stream, that contains a much lower concentration of inorganic contaminants than the contaminated feedstock.

The contaminated renewable oil can be comprised of lipid-type oils including, but not limited to virgin plant oils; tri-, di- and monoglycerides; free fatty acids; lecithin, gums and phospholipids; soaps of fatty acids; deodorizer distillates; acid oil; crude tall oil and derivatives; waste fats, oils, and greases including used cooking oil, yellow grease, brown grease, poultry fat, and tallow; distillers corn oil; algal oils; microbial oils; bio oils, or mixtures or water emulsions thereof. When the feedstock comprises renewable, lipid-based oils, the organic phase after separation comprises lipids with low metals content. It can be appreciated that different feedstocks may be blended in proportions that will improve processability, performance, and economics.

The feedstock and metal scavengers or reactants, comprising salt or acid solutions or mixtures thereof, can be mixed by combining the streams using tee connections, static mixers, pumps, mixing valves, and the like, while the mixture is maintained in turbulent flow to form a feedstock-water-reactant mixture. The metal scavengers and/or reactants can be added to the water stream before mixing with the feedstock, or can be added to the feedstock-water mixture before entering the hydrothermal purification reactor, or can be added at any point along the process, including at a point after processing in the hydrothermal purification reactor.

It can be appreciated that the metal scavengers or reactants may include strong acids, weak acids including carbonic acid, organic acids, salts, and mixtures thereof.

The hydrothermal purification reactor can comprise a tubular plug-flow reactor (PFR) designed to maintain turbulent flow conditions at Reynolds numbers equal to or greater than 2,000. The feedstock-water-reactant mixture can be heated to a reaction temperature within a range from 150° C. to 350° C. The pressure in the hydrothermal purification reactor can be maintained within a range from 100 psig to 2,500 psig and is controlled to maintain the mixture in a liquid, hydrothermal phase. At these conditions, the space time of the feedstock-water-reactant mixture in the hydrothermal reactor can range from approximately 10 seconds to 15 minutes, 10 seconds to 10 minutes, or 10 seconds to 5 minutes. Alternatively, the hydrothermal reactor can operate at a pressure within a range from 500 to 1000 psig, a temperature within a range from 200 to 300° C., and a space time (or superficial residence time) of less than or up to 2 minutes. It can be appreciated that the pressure, temperature, and residence time used in the hydrothermal purification reactor can be determined based on several variables including the particular feedstock being treated, the type of contaminants in the feedstock, and the particular metal scavengers or reactants, comprising acid or salt solutions that are mixed with the water and the feedstock. It can also be appreciated that the particular pressure, temperatures and residence times can be outside of the parameters outlined above depending on the variables listed above and the level of contaminant reduction required. It can be appreciated that space time is synonymous with "supercritical residence time" and is commonly used in relation to flow reactors where reactions, fluid densities, or phases change within the reactor. Space time is defined as the time necessary to process one reactor volume of fluid based on entrance conditions (standard temperature and pressure). Because hydrothermal (liquid phase) conditions are maintained, the density of the fluid mixture at operating temperatures between 200 and 300° C. decrease to approximately 87% and 72%, respectively, of the density at entrance conditions. This means that actual residence times are approximately 87% and 72% of the space times at these operating temperatures.

The feedstock-water-reactant mixture can exist as a single-phase solution or exist as a two-phase, feedstock-water mixture depending on operating temperature and solubility of the feedstocks in water at the operating temperature. The water concentration of the feedstock-water-reactant mixture is controlled to result in complete dissolution of inorganic salt contaminants into the aqueous effluent. The process of separating the reactor effluent into the aqueous stream and the organic product stream includes the steps of cooling, depressurizing, and separating to produce a clean lipid stream and a water stream. Separation of oil phase from the aqueous phase can be conducted with use of at least one of a gravity separator, a gravity separator that includes electrostatic or coalescer elements, a hydrocyclone, a centrifuge, and/or any combination thereof and may be accelerated by use of demulsifying agents. Separation can be performed before or after cooling and pressure letdown.

The present invention also includes a hydrothermal purification system for decontaminating renewable oils comprised of a hydrothermal purification reactor system operated at temperature, pressure, and turbulent flow conditions to maintain a liquid, hydrothermal phase that results in rapid hydrolysis of phospholipids without causing thermal cracking of lipid carbon-carbon bonds, polymerization, or isomerization of the feedstock and a separation system for removing a clean oil product stream and water stream containing inorganic contaminants from the effluent of the hydrothermal purification reactor system. The hydrothermal purification reactor system can be operated at turbulent flow having a Reynolds Number (Re) of at least 2000. The hydrothermal purification reactor system can be operated at a pressure within the range from 100 psig to 2,500 psig and a temperature within a range from 150° C. to 350° C. and wherein cleanup of the oils occurs at a space time (or superficial residence time) of approximately 10 seconds to 15 minutes, 10 seconds to 10 minutes, or 10 seconds to 5 minutes. Alternatively, the hydrothermal purification reactor can be operated at a pressure within a range of from 500 to 1000 psig, a temperature within a range from 200 to 300° C., and a space time of less than or up to 2 minutes. It can be appreciated that the ratio of water-to-oil, pressure, temperature, and residence time of the hydrothermal purification reactor system can be determined based on several variables including the particular feedstock being treated, the type of contaminants in the feedstock, the extent of hydrolysis, and the particular metal scavengers and/or reactants, wherein the metal scavengers or reactants comprise acid or salt solutions, that is mixed with the water and the feedstock. It can also be appreciated that the particular pressure, temperatures and space times can be outside of the parameters outlined above depending on the variables listed above and the level of contaminant reduction required.

DESCRIPTION OF THE INVENTION

As used herein, unless otherwise expressly specified, all numbers, such as those expressing values, ranges, amounts, or percentages may be read as if prefaced by the word "about", even if the term does not expressly appear. Any numerical range recited herein is intended to include all sub-ranges subsumed therein. Plural encompasses singular and vice versa. When ranges are given, any endpoints of those ranges and/or numbers within those ranges can be combined with the scope of the present invention. "Including", "such as", "for example", and like terms mean "including/such as/for example but not limited to".

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting. Like reference numerals refer to like elements.

It should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all sub-ranges beginning with a minimum value equal to or greater than 1 and ending with a maximum value equal to or less than 10, and all sub-ranges in between, e.g., 1 to 6.3, or 5.5 to 10, or 2.7 to 6.1.

The present invention is directed to a continuous-flow process and system for the hydrothermal purification of renewable feedstocks, such as plant oils, algal and microbial oils, waste vegetable oils, brown grease, tallow, tall oil, acid oil, and bio oils. The process of the present invention separates undesirable contaminants such as minerals, metals, and salts from the feedstock to produce clean, purified oil. By "clean" it is meant that contaminants in the product have been reduced by greater than 95%, such as by more than 99%, often resulting in trace amounts (near or below typical analytical method detection limits) of contaminants compared to the feedstock. The level of contaminants in the clean oil is minimized to greatly reduce deposition, polymerization, and coking in downstream conversion equipment and deactivation or fouling of downstream conversion catalysts. The purification process is accomplished by hydrolysis, solvation, acidulation, and concentration of contaminants in the water effluent stream. The HTP process does not include conversion of the feedstock. By "conversion" it is meant molecular rearrangement of lipids or FFAs, such as occurs in decarboxylation, thermal cracking, isomerization, cyclization, polymerization, hydrogenation, or dehydrogenation. These conversion processes may be performed downstream of the system of the present invention, thereby benefitting from conversion of clean feedstock and reducing or eliminating the problems associated with conversion of contaminated feedstocks.

The contaminated feedstocks may be renewable feedstocks, such as plant oil. Suitable plant oils for treating according to the present invention include oils of canola, *Carinata*, castor, Jatropha, palm, Pongamia, soy bean, Tung, and/or corn (such as derived from distiller grains), soap stock, waste vegetable oil, yellow grease (from cooking oil), brown grease (from grease traps and wastewater treatment), highly acidic oils (also referred to as acidic oils), animal tallow, algal oil, microbial oil, terpenes and other pine-related byproducts from tall oils, or other biosynthetic oils (such as derived from pyrolysis, esterification, oligomerization, or polymerization) and mixtures thereof. It can be appreciated that waste fats, oils, greases, phosphatide gums, soaps, and mixtures thereof can be in the form of mixtures and emulsions that impede of prevent conventional pretreatment operations. Contaminants that may be removed include inorganic elements, such as halides (e.g., Cl, Br, I), phosphorus and phosphorus-containing species, alkali metals and metalloids (e.g., B, Si, As), other metals (e.g., Na, K, Ca, Fe, Mg, Ni, V, Zn, Cr, Al, Sn, Pb, etc.), and organic compounds (proteins, polymers such as polyethylene). The process and system results in clean oil by achieving more than 95% (such as more than 99%) reduction in phosphorus, salt, mineral, and metal content. HTP process conditions can be controlled in a manner that will retain triglycerides in feedstocks containing triglycerides, or process conditions can be adjusted to achieve rapid hydrolysis of triglycerides into free fatty acids. In feedstocks containing phospholipids, HTP process conditions can be controlled in a manner to reduce phosphorus content to less than 2 parts per million (ppm) at a fraction of the yield loss associated with conventional degumming. The system of the present invention includes a high-temperature, high-pressure, hydrothermal purification reactor system coupled with addition of acids, salts, or metal scavengers, and components for separation and/or recovery of a clean oil product with no other operations or additions therebetween. The integrated reactor and separation systems are the basis of the HTP process.

Figure 1:
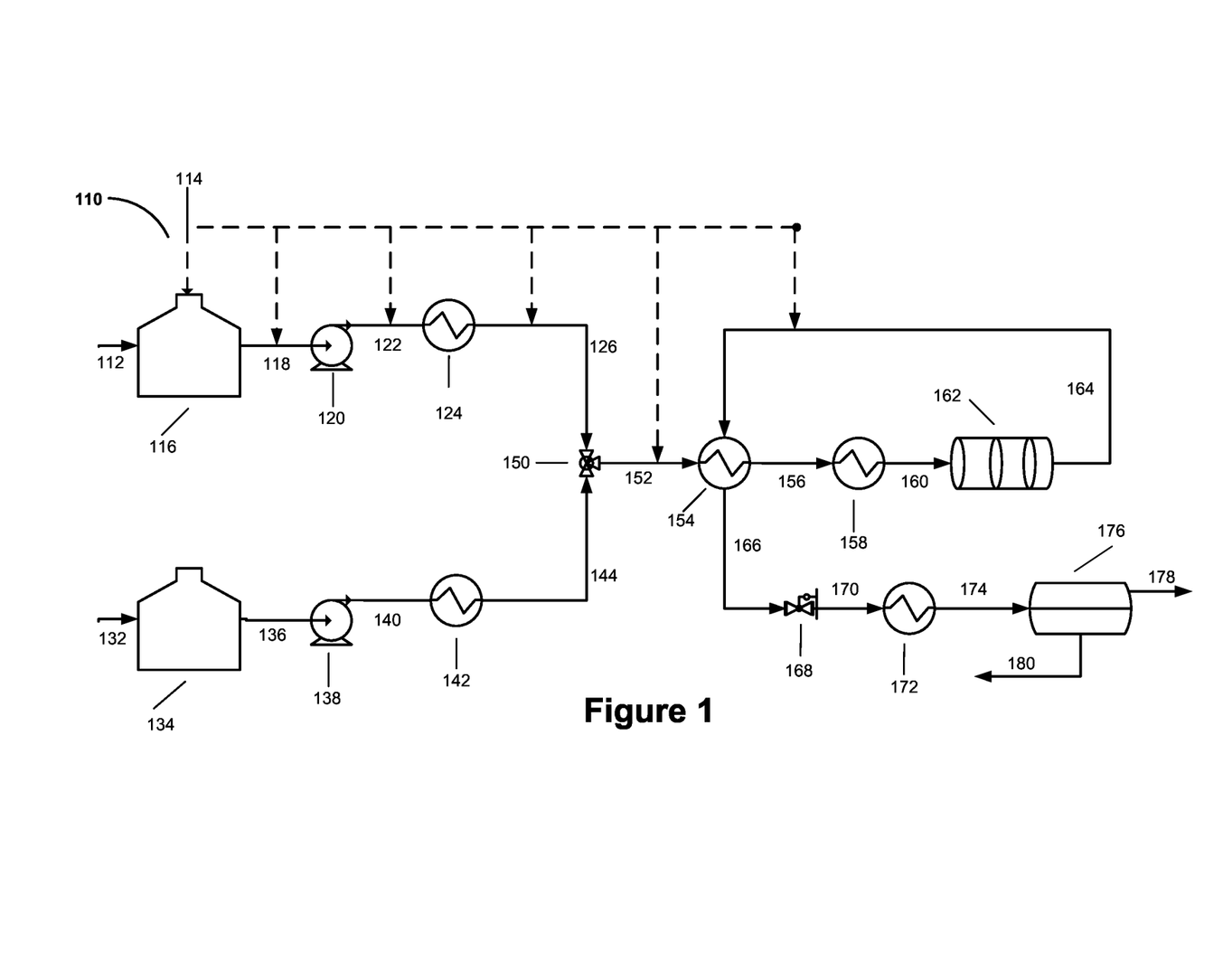
FIG. 1 is a schematic view of the hydrothermal purification (HTP) system with acidulation in accordance with an embodiment the present disclosure for reducing contaminants contained in renewable feedstock that incorporates a plug-flow reactor and oil-water separator for the recovery of a purified renewable oil.

Reference is now made to FIG. 1, which shows a schematic view of the HTP process and system, generally indicated as 110, in accordance with an embodiment of the invention, for the purification of renewable oils, including waste fats, oils, and greases such as brown grease and yellow grease, where the clean oil and water products are recovered by conventional oil-water separation processes. The process and system include providing a renewable contaminated feedstock 132. The contaminated feedstock 132 may be fed into an equalization tank 134. Generally, an equalization tank acts as a holding tank that allows for the equalization of flow of the feedstock. An equalization tank can also act as a conditioning operation where the temperature of the feedstock is controlled to maintain desired flow characteristics. The contaminated feedstock exits the equalization tank 134 at 136 and enters into pump 138 to form a pressurized feed stream 140. The pressurized feed stream 140 can be preheated by a heating device, such as a heat exchanger 142, to form a heated feed stream 144.

A water feed stream 112 can be supplied to an equalization tank 116 and fed at 118 to a pump 120 to form a pressurized water stream 122. The pressurized water stream 122 can be heated by a heating device, such as a heat exchanger 124, to form a heated water stream 126. It should be appreciated that streams 126 and 144 can be heated by any known process or device and includes heat recovery from other process streams to optimize overall thermal efficiency. Reactants and/or metal scavenger salts or solutions are added at 114. It can be appreciated that stream 114 can be added at any location throughout the HTP process, such as into the equalization tank 116 and/or to streams 118, 122, 126. It can also be appreciated that the reactants and/or metal scavengers can be simultaneously added at these multiple locations.

The heated organic feed stream 144 and heated water stream 126 are mixed at mixing device 150 to form a high-pressure mixed stream 152. Sufficient pressure is required to maintain the feedstock and water streams in liquid phase at conditions necessary to accomplish metals reduction and phospholipid hydrolysis based on the feedstock contaminants. Renewable feedstocks may become miscible with water at temperatures as low as 300° C. and pressure as low as 1,250 psig. It can be appreciated that the mixing device 150 may be a combination of the two streams via a tee connection or may include one or more conventional static mixers, mixing valves, or pumps. The type of mixing device and degree of mixing are dependent on the feedstock, the flow properties of the feedstock, and miscibility of the feedstock with water. As shown in FIG. 1, the reactants and/or metal scavenger salts 114 can also be added to stream 152. The high-pressure mixed stream 152 is heated in a feed-effluent heat exchanger 154 to form a heated stream 156. It can be appreciated that the feed-effluent heat exchanger 154 can be any combination of heat exchangers configured throughout the process to maximize overall thermal efficiency. Stream 156 is fed to heater 158, which can be any type of heater or heat exchanger, which heats the oil-water mixture up to the target treatment temperature, such as within the range from 150° C. to 350° C., at stream 160 before it enters a hydrothermal purification reactor 162.

The hydrothermal purification reactor 162 operates at high Reynolds numbers (at least or greater than 2000) which creates turbulent fluid dynamics; and achieves rapid mixing, mass transfer, and heat transfer. This enables the hydrothermal purification reactor to operate at much shorter space times and at higher operating temperatures than the prior art systems for desalting (100° C.-150° C.) or for fat-splitting via the Colgate-Emery process (250-260° C.). At these conditions, the hydrothermal purification reactor 162 achieves greatly reduced reactor size relative to prior art systems. The operating conditions of the hydrothermal purification reactor 162 may be selected based on the contaminants in the feedstock and the cleanup requirements. The water-to-oil weight ratio in the hydrothermal purification reactor 162 may be between 1:100 and 3:1, such as between 1:10 and 1:1. The hydrothermal purification reactor 162 is operated at sufficient pressure to maintain liquid phase such as in the range of 250-3,000 psig or 500-1,500 psig. The hydrothermal purification reactor 162 is configured to achieve and operate at turbulent flow conditions to optimize mixing and maximize mass and heat transfer. At operating temperature and pressure, space times range from less than or up to 10 seconds to 15 minutes depending on the particular feedstock and contaminant reduction requirements. As used herein, space time is calculated based on the reactor volume and the volume of the feedstocks at standard conditions (temperature of 20° C. and pressure of one atmosphere). Actual hydraulic residence times may be calculated based on operating conditions (temperature and pressure) and the water-to-oil weight ratio. The hydrothermal purification reactor 162 can be a tubular plug-flow reactor (PFR). It can be appreciated that the hydrothermal purification reactor can be operated as an adiabatic reactor due to the very short space time, or as an isothermal reactor. Different reactor conditions provide a range of mixing, heat transfer, space time, and product quality scenarios suited for the feedstock type and contaminant reduction requirements. In general, PFR systems will exhibit a Reynolds Number (Re) of at least 2,000, within the range of 2,000-4,000, or higher than 4,000, resulting in turbulent flow, intimate mixing, and high heat and mass transfer rates. According to one embodiment, the present invention can employ a combination of space times less than or up to 15 minutes and Reynolds Number (Re) greater than 4,000 throughout the hydrothermal reaction zone. One example of a hydrothermal purification reactor 162 that can be used is the high-rate reactor disclosed in U.S. Pat. No. 10,071,322, the disclosure of which is incorporated herein in its entirety.

Therefore, the hydrothermal purification reactor is operated at conditions where conversion reactions do not occur and where coke that would affect performance is not formed. Instead, inorganic contaminants are liberated at hydrothermal operating conditions and removed by the integrated hydrothermal purification reactor and oil-water separation systems.

Effluent 164 of the hydrothermal purification reactor 162 is cooled in the feed-effluent heat exchanger 154, yielding a partially-cooled product 166, which then passes through a pressure control valve 168 that maintains system pressure. The reactants and/or metal scavenger salts 114 can also be added to stream 164 after exiting the hydrothermal purification reactor 162. Depressurized product stream 170 is further cooled as necessary by a cooling heat exchanger 172. A cooled product stream 170 is then fed to an oil-water separator 176. Separation of oil phase from the aqueous phase can be conducted with use of at least one of a gravity separator, a gravity separator that includes electrostatic or coalescer elements, a hydrocyclone, a centrifuge, and/or any combination thereof and may be accelerated by use of demulsifying agents to reduce product moisture content. It can be appreciated that separation can be performed before or after pressure letdown depending on subsequent treatment of the clean product oil. After partial cooling, a high-pressure separator can be employed to produce a pressurized clean product oil for subsequent treatment to eliminate the need for an additional pumping operation. Clean product oil 178 and process water stream 180 are removed from the separator 176. The hydrothermal system 110, operated as described above, rapidly dissociates inorganic contaminants (e.g., salts, minerals, and/or metals) which partition into the process water stream 180 and greater than 95% (such as at least up to 99%) of the contaminants are eliminated from the contaminated feedstock 132.

The clean oil 178 may be further processed (not shown) into chemicals or fuels depending on the type of feedstocks treated and the product objectives. Renewable feedstocks may be hydrothermally cracked into synthetic crude via a high-rate hydrothermal reactor system (as described above) and then hydrotreated into transportation fuels or chemicals. Alternatively, the clean renewable oil product 178 may be converted into biodiesel via esterification; or converted into renewable fuels and chemicals via hydrotreatment, hydroisomerization, and hydrocracking or other conventional refining processes.

The process water stream 180 may be treated and reused, further processed to recover byproducts, applied to land, de-watered and used as an animal feed supplement, or treated in conventional wastewater treatment processes (not shown). The fate of the process water stream 180 is dependent at least in part on the constituents of the feedstock and the water recovery and reuse objectives. For instance, when the hydrothermal system 110 is used for desalting the feedstock, the process water stream 180 may contain both inorganic and trace organic contaminants and may be sent directly to wastewater treatment.

The system 110 depicted in FIG. 1 may be used for rapid hydrolysis. Rapid hydrolysis is most effectively accomplished in a liquid or hydrothermal operation. During rapid hydrolysis of triglyceride oils, the clean oil 178 consists of primarily FFAs and the process water stream 180 includes water and glycerin. Pure glycerin can be recovered from the process water stream 180 by conventional distillation processes.

Alternatively, system 110 may be used for degumming or phosphorus removal. Rapid phosphorus removal is most effectively accomplished in the liquid phase where the temperature and pressure are controlled to maintain water in the saturated phase. Rapid hydrolysis of phospholipids in hydrothermal purification reactor 162 is achieved by cleaving the phosphate group from the glycerin backbone of a phospholipid as well as cleaving groups that may include fatty acids and other organic constituents from the phospholipid such as choline, ethanolamine, serine, or inositol constituents of phospholipids. Phosphate is removed in the aqueous phase of the reaction mixture, while the fatty acids, which typically represent over 70 wt. % of a phospholipid, are retained for subsequent processing into chemicals or fuels. The phosphorus content of clean oil 178 from the feedstock high in phospholipid content may be reduced from greater than 500 ppm to less than 2 ppm and total metal content may be reduced to less than 10 ppm. The yield of low-phosphorus oil from oil high in phospholipids is greatly increased compared to conventional degumming processes. For example, for an algal oil containing 6,000 ppm of phosphorus, the process of the present invention may increase the yield of low-phosphorus oil by more than 10%, whereby the clean oil 178 includes clean FFAs with a low phosphorus content. The process water stream 180 includes water and phosphate ion ($PO_4^{3-}$) and may be recovered and reused as a nutrient source for growing crops or algae.

An advantage of the Hydrothermal Purification process and system of the present invention is that the small physical footprint of the system 110 requires low capital and operating costs. The hydrothermal process can operate at very short space times, such as less than two minutes. This results in relatively small equipment and low capital cost. When used for degumming, operating costs for HTP are lower than conventional chemical degumming because degumming acids are not required, products and byproducts are easily separated and recovered using conventional oil-water separation technology, high-quality water may be recovered and reused without additional treatment, other valuable byproducts, such as glycerin, may be recovered, and no other liquid or solid waste products are generated. The present invention accomplishes rapid acidulation without the need for a strong mineral acid, to obtain clean lipid products without the formation of residual waste streams cause by the presence of phospholipids because phospholipids are hydrolyzed during hydrothermal purification. The diglyceride residual produced by the hydrolysis of phospholipids is not only recovered to improve yield, but oil and water phases can then be easily separated with no rag layer formation or residual effluent generation. When used for rapid acidulation, such as for soap stocks or lipids containing metal soaps, strong mineral acids such as sulfuric acid are not required and weaker acids such as citric, acetic, phosphoric, and carbonic acids can be employed to obtain clean lipid products with no rag layer formation. The use of weaker acids permits the use of low-cost materials of construction, which reduces capital costs.

It should be appreciated that optimal operating conditions are dependent on feedstock quality and operating conditions can be varied to achieve the required product quality. Operating conditions can be varied to maximize desalting (e.g., waste vegetable oil), maximize acidulation, maximize phospholipid hydrolysis, or maximize glyceride hydrolysis and glycerin recovery. It can also be appreciated that the hydrothermal process may be operated in a manner to reduce metals in highly contaminated feedstocks, such as brown grease, and produce a clean lipid product and an effluent water that contains inorganic contaminants.

The following Examples are presented to demonstrate the general principles of reducing contaminants in feedstock using HTP. All amounts listed are described in parts by weight, unless otherwise indicated. The invention should not be considered as limited to the specific Examples presented. Whereas particular embodiments of this invention have been described above for purposes of illustration, it will be evident to those skilled in the art that numerous variations of the details of the present invention may be made without departing from the invention as defined in the appended claims.

EXAMPLES

Example 1: Distiller's Corn Oil and Used Cooking Oil

A 50:50 blend of distiller's corn oil (DCO) and used cooking oil (UCO) was the feedstock to a pilot scale hydrothermal purification system that was configured as shown in FIG. 1. The tubular plug flow reactor was designed to achieve a 2-minute space time based on the combined volumetric flow rates of water and oil and to maintain a Reynolds Number >4000. Operating conditions are shown in Table 1. Pressure was controlled at 1000 psig, which ensured that liquid-phase, hydrothermal conditions were maintained. A small amount of phosphoric acid was added to the feed water to achieve an acid dose rate equivalent to 2.6 mmol of phosphoric acid per liter of oil feed. The oil and water were gravity separated at 80° C. in the product separator.

TABLE 1

Operating Conditions for Example 1

| Parameter | Value |
| --- | --- |
| Water-to-oil ratio, v/v | 0.3 |
| Reactor temperature, ° C. | 250 |

TABLE 1-continued

Operating Conditions for Example 1

| Parameter | Value |
| --- | --- |
| Reactor pressure, psig | 1400 |
| Space time, min | 2 |
| Reactor Reynolds Number, Re | >4,000 |
| Acid dose rate, mmol/L of oil | 2.6 |

Table 2 compares the feed and product properties. Total metals were reduced to less than 1 ppm and phosphorus was reduced by 98%. The total acid number (TAN) increased slightly from 25.6 to 34.5 indicating that a small amount of hydrolysis had occurred.

TABLE 2

Feed and Product Properties for Example 1.

| Property | Feed | Product |
| --- | --- | --- |
| TAN (mg KOH/g oil) | 25.6 | 34.5 |
| P (ppm) | 4.7 | 0.1 |
| Ca (ppm) | 0.3 | 0.3 |
| Mg (ppm) | 0.2 | <0.1 |
| Na (ppm) | 4.5 | <0.1 |
| K (ppm) | 2.7 | 0.5 |

Example 2: Brown Grease

Brown grease was the feedstock to a pilot scale hydrothermal purification system that was configured as shown in FIG. 1. The tubular plug flow reactor was designed to achieve a 2-minute space time based on the combined volumetric flow rates of water and oil and to maintain a Reynolds Number >4000. Operating conditions are shown in Table 3. Pressure was controlled at 1000 psig, which ensured that liquid-phase, hydrothermal conditions were maintained. Citric acid was added to the feed water to achieve an acid dose rate equivalent to 30 mmol of citric acid per liter of oil feed. The oil and water were gravity separated at 80° C. in the product separator.

TABLE 3

Operating Conditions for Example 2

| Parameter | Value |
| --- | --- |
| Water-to-oil ratio, v/v | 0.3 |
| Reactor temperature, ° C. | 200 |
| Reactor pressure, psig | 1000 |
| Space time, min | 1.5 |
| Reactor Reynolds Number, Re | >4,000 |
| Acid dose rate, mmol/L of oil | 30 |

Table 4 compares the feed and product Properties. The phosphorus content was reduced from 23.5 to less than 2 ppm. Total metals content was reduced by more than 96% to less than 15 ppm. The brown grease feedstock had a high TAN which increased by 18 indicating some hydrolysis had occurred.

TABLE 4

Feed and Product Properties for Example 2

| Property | Feed | Product |
| --- | --- | --- |
| TAN (mg KOH/g oil) | 142 | 160 |
| P (ppm) | 23.5 | 1.6 |
| Ca (ppm) | 148.5 | 3.1 |
| Mg (ppm) | 1.8 | 0.3 |
| Na (ppm) | 34.6 | 7.8 |
| K (ppm) | 9.9 | 0.8 |
| Fe (ppm) | 174.3 | 0.5 |

Example 3: Crude Soybean Oil

Crude soybean oil is typically refined, bleached, and deodorized through a multistep process to achieve a product low in phosphorus and metals. The crude soybean oil used in this example had not been refined and contained over 500 ppm of phosphorus and over 260 ppm of other metals. Crude soybean oil was fed to a pilot scale hydrothermal purification system that was configured as shown in FIG. 1. The tubular plug flow reactor was designed to achieve a 2-minute space time based on the combined volumetric flow rates of water and oil and to maintain a Reynolds Number >4000. Operating conditions are shown in Table 5. Pressure was controlled at 1000 psig, which ensured that liquid-phase, hydrothermal conditions were maintained. Citric acid was added to the feed water to achieve an acid dose rate equivalent to 11.4 mmol of citric acid per liter of oil feed. The oil and water were gravity separated at 80° C. in the product separator.

TABLE 5

Operating Conditions for Example 3

| Parameter | Value |
| --- | --- |
| Water-to-oil ratio, v/v | 0.3 |
| Reactor temperature, ° C. | 275 |
| Reactor pressure, psig | 1000 |
| Space time, min | 2 |
| Reactor Reynolds Number, Re | >4,000 |
| Acid dose rate, mmol/L of oil | 11.4 |

Table 6 compares the feed and product properties. Phosphorus content was reduced from 510 to 2.9 ppm or by 99.5%. Metals content was reduced to less than 1 ppm. The TAN increase only slightly indicating that near complete hydrolysis of phospholipids was achieved with essentially no hydrolysis of triglycerides or of the organic backbone of the phospholipid.

TABLE 6

Feed and Product Properties for Example 3

| Property | Feed | Product |
| --- | --- | --- |
| TAN (mg KOH/g oil) | 1.0 | 5.6 |
| P (ppm) | 510 | 2.9 |
| Ca (ppm) | 55.2 | <0.1 |
| Mg (ppm) | 41.4 | <0.1 |
| Na (ppm) | <0.1 | <0.1 |
| K (ppm) | 172.7 | <0.1 |
| Fe (ppm) | 0.5 | <0.1 |

Example 4: Crude Tall Oil

Tall oil is a viscous yellow-black odorous liquid obtained as a by-product of the kraft process of wood pulp manufacture when pulping mainly coniferous trees. It is composed of a mixture of rosin acids, fatty acids, alcohols, sterols and other alkyl hydrocarbon derivatives. Crude Tall oil was fed to a pilot scale hydrothermal purification system that was configured as shown in FIG. 1. The tubular plug flow reactor was designed to achieve a 2-minute space time based on the combined volumetric flow rates of water and oil and to maintain a Reynolds Number >2000. Operating conditions are shown in Table 7. Pressure was controlled at 2000 psig, which ensured that liquid-phase, hydrothermal conditions were maintained. In this example, phosphoric acid was added to the water feed stream. The oil and water products were gravity separated at 80° C. in the product separator.

TABLE 7

Operating Conditions for Example 4

| Parameter | Value |
| --- | --- |
| Water-to-oil ratio, v/v | 0.3 |
| Reactor temperature, ° C. | 325 |
| Reactor pressure, psig | 2000 |
| Space time, min | 2 |
| Reactor Reynolds Number, Re | >2,000 |
| Acid dose rate, mmol/L of oil | 9.0 |

Table 8 compares the feed and product properties. Phosphorus was reduced from 13.4 to less than 1 ppm. Total metals were reduced by >98% to less than 3 ppm. The total acid number (TAN) of the product oil did not change and remained at 169.

TABLE 8

Feed and Product Properties for Example 4

| Property | Feed | Product |
| --- | --- | --- |
| TAN (mg KOH/g oil) | 169 | 169 |
| P (ppm) | 13.4 | 0.4 |
| Ca (ppm) | 2.4 | 0.45 |
| Mg (ppm) | 0.55 | 0.07 |
| Na (ppm) | 118 | 2.43 |
| K (ppm) | 11.4 | <0.1 |
| Fe (ppm) | 30.9 | <0.1 |

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of this description. For example, it is to be understood that the present invention contemplates that, to the extent possible, one or more features of any embodiment can be combined with one or more features of any other embodiment.

The invention claimed is:
1. A process for reducing contaminants contained in a contaminated feedstock comprising:
mixing the contaminated feedstock with water and at least one of metal scavengers or reactants, wherein the metal scavengers or reactants comprise acid or salt solutions, or a combination of acid and salt solutions, to form a feedstock-water-reactant mixture;

feeding the feedstock-water-reactant mixture under pressure into a hydrothermal purification reactor, wherein the mixture is subject to heat, pressure, and turbulent flow conditions at a Reynolds number of at least 2000;

maintaining the temperature, pressure, and turbulent flow conditions of the feedstock-water-reactant mixture in a manner that causes rapid reaction of the inorganic contaminants with the at least one of the metal scavengers or reactants to form inorganic salts that partition into an aqueous phase and maintaining the temperature, pressure, and turbulent flow conditions of the feedstock-water-reactant mixture for a space time of less than or up to 10 seconds to less than 10 minutes and in a manner that prevents the organic portion of the feedstock in the mixture from undergoing thermal cracking of carbon-carbon bonds into lower molecular weight fragments, prevents the compounds in the organic fraction from polymerizing, and/or prevent the compounds in the organic fraction from isomerizing from the "cis-" isomer to the "trans-" isomer to form a hydrothermal reactor effluent, wherein the space time of the feedstock-water-reactant mixture in the hydrothermal purification reactor at an operating pressure within a range from 100 psig to 2,500 psig and an operating temperature within a range from 150° C. to 350° C., is within a range of approximately from 10 seconds to 5 minutes; and separating the hydrothermal reactor effluent into the aqueous phase containing salts of the inorganic contaminants and an organic phase that contains a lower concentration of inorganic contaminants than the contaminated feedstock.

2. The process of claim 1, wherein the at least one of metal scavengers or reactants are mixed with the water prior to mixing with the feedstock or are added to the oil-water mixture at any point throughout the hydrothermal purification process.

3. The process of claim 1, wherein the contaminated feedstock is comprised of renewable oils and greases including virgin plant oils; tri-, di- and monoglycerides; free fatty acids; lecithin, gums and phospholipids; soap stock and soaps of fatty acids; deodorizer distillates;

acid oil; waste fats, oils, and greases including used cooking oil, yellow grease, brown grease, and animal tallow; distillers corn oil; algal oils; microbial oils; skimmed fats oils and greases from waste water treatment; pyrolysis oil; or mixtures or water emulsions thereof.

4. The process of claim 1, wherein different feedstocks may be blended in proportions that will improve feedstock processability, system performance, and/or process economics.

5. The process of claim 1, wherein the feedstock and the at least one of the metal scavengers or reactants are mixed by combining the streams using tee connections, static mixers, pumps, or mixing valves while the mixture is maintained in turbulent flow to form a feedstock-water-reactant mixture.

6. The process of claim 1, wherein the at least one of the metal scavengers or reactants comprises at least one of strong acids; weak acids, organic acids, salts, and mixtures thereof.

7. The process of claim 1, wherein the hydrothermal purification reactor comprises a tubular plug-flow reactor (PFR).

8. The process of claim 1, wherein the feedstock-water-reactant mixture is heated to a reaction temperature within a range from 150° C. to 350° C.

9. The process of claim 1, wherein the pressure in the hydrothermal purification reactor is maintained within a range from 100 psig to 2,500 psig and is controlled to maintain the mixture in a liquid, hydrothermal, phase.

10. The process of claim 1, wherein the feedstock-water-reactant mixture can exist as a single-phase solution or exist as a two-phase, feedstock-water mixture.

11. The process of claim 1, wherein the hydrothermal purification reactor may be operated as an isothermal reactor or an adiabatic reactor.

12. The process of claim 1, wherein the water concentration of the feedstock-water-reactant mixture is controlled to result in dissolution of inorganic salt contaminants into the aqueous phase.

13. The process of claim 1, wherein separating the reactor effluent into the aqueous stream and the product stream includes the steps of cooling, depressurizing, and separating to produce a clean oil stream and a water stream.

14. The process of claim 1, wherein separation of the clean oil and water stream is accomplished by using at least of: a gravity separator, an electrostatic assisted gravity separator, a coalescer, a hydroclone, a centrifuge, addition of demulsifying agents or water clarifiers, or any combination thereof.

15. A process for reducing contaminants and breaking emulsions in a renewable feedstock/water emulsion comprising:

mixing an oil/water emulsion with water and at least one of metal scavengers or reactants, wherein the metal scavengers or reactants comprise acid or salt solutions, or a combination of acid and salt solutions, to form a feedstock-water-emulsion mixture;

feeding the feedstock-water-emulsion mixture under pressure into a hydrothermal purification reactor, wherein the mixture is subject to heat, pressure, and turbulent flow conditions at a Reynolds Number of at least 2000;

maintaining the temperature, pressure, and turbulent flow conditions of the feedstock-water-emulsion mixture in a manner that causes rapid reaction of the inorganic contaminants with the at least one of the metal scavengers or reactants to form inorganic salts that partition into an aqueous phase and maintaining the temperature, pressure, and turbulent flow conditions of the feedstock-water-emulsion mixture for a space time of less than or up to seconds to less than 10 minutes to prevent an organic portion of the feedstock in the mixture to undergo thermal cracking of lipid carbon-carbon bonds into lower molecular weight fragments, prevents the unsaturated compounds in the organic fraction from polymerizing, and/or prevent the unsaturated lipid compounds in the organic fraction from isomerizing from the "cis-" isomer to the "trans-" isomer to form a hydrothermal reactor effluent, wherein the space time of the feedstock-water-emulsion mixture in the hydrothermal purification reactor at an operating pressure within a range from 100 psig to 2,500 psig and an operating temperature within a range from 150° C. to 350° C., is within a range of approximately from 10 seconds to 5 minutes; and separating the hydrothermal reactor effluent into an aqueous phase containing salts of the inorganic contaminants.

16. The process of claim 15, wherein the feedstock-water-emulsion mixture in the hydrothermal purification reactor is maintained at an operating pressure within a range of approximately from 100 psig to 2,500 psig and is heated to an operating temperature within a range from 150° C. to 350° C. for a space time within a range of approximately from 10 seconds to 5 minutes.

17. The process of claim 1, wherein the feedstock-water-reactant mixture is heated to a reaction temperature within a range from greater than 210° C. to 350° C.

18. The process of claim 1, wherein the hydrothermal purification reactor, operates at a Reynolds number of at least 4000.

* * * * *

UNITED STATES PATENT AND TRADEMARK OFFICE
CERTIFICATE OF CORRECTION

PATENT NO. : 11,781,075 B2
APPLICATION NO. : 17/398082
DATED : October 10, 2023
INVENTOR(S) : Edward N. Coppola et al.

It is certified that error appears in the above-identified patent and that said Letters Patent is hereby corrected as shown below:

On the Title Page

Replace the title page with the attached title page, showing the corrected number of drawing sheets.

In the Drawings

Figure 2:
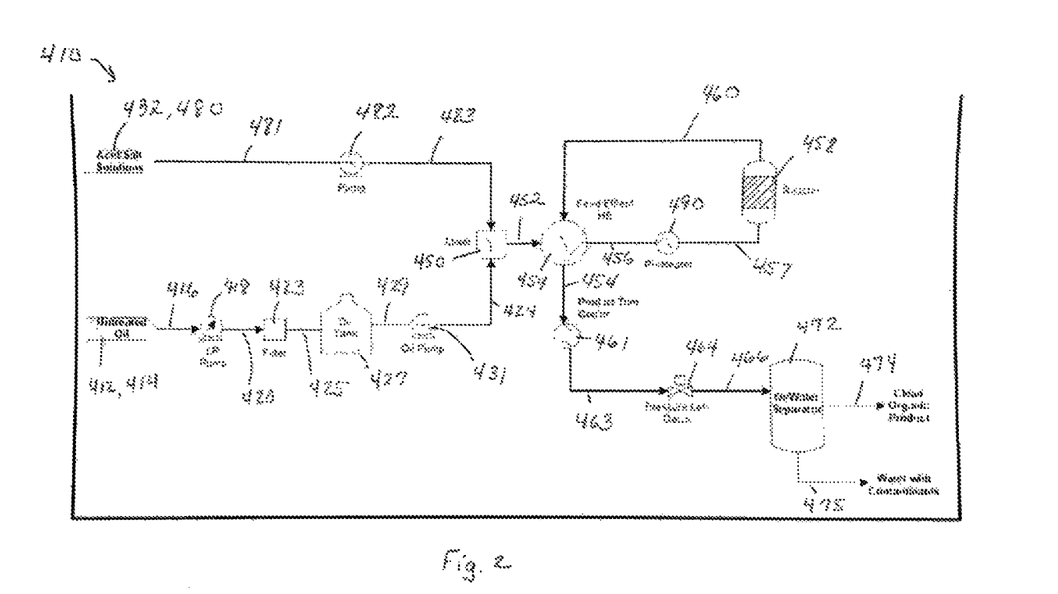

Sheet 2, Figure 2 should be cancelled.

Signed and Sealed this
Fifth Day of December, 2023

Katherine Kelly Vidal
*Director of the United States Patent and Trademark Office*

(12) United States Patent
Coppola et al.

(10) Patent No.: US 11,781,075 B2
(45) Date of Patent: Oct. 10, 2023

(54) HYDROTHERMAL PURIFICATION PROCESS

(71) Applicant: Applied Research Associates, Inc., Albuquerque, NM (US)

(72) Inventors: Edward N. Coppola, Southport, FL (US); Sanjay Nana, Panama City, FL (US); Charles Red, Jr., Youngstown, FL (US); Jocelyn Marie Goodwin, Panama City, FL (US)

(73) Assignee: Applied Research Associates, Inc., Albuquerque, NM (US)

(*) Notice: Subject to any disclaimer, the term of this patent is extended or adjusted under 35 U.S.C. 154(b) by 10 days.

(21) Appl. No.: 17/398,082

(22) Filed: Aug. 10, 2021

(65) Prior Publication Data
US 2022/0049167 A1    Feb. 17, 2022

Related U.S. Application Data

(60) Provisional application No. 63/064,234, filed on Aug. 11, 2020.

(51) Int. Cl.
*C10G 49/18*    (2006.01)
*C10G 49/20*    (2006.01)
*C10G 49/22*    (2006.01)
*C10G 49/26*    (2006.01)

(52) U.S. Cl.
CPC ............ *C10G 49/20* (2013.01); *C10G 49/26* (2013.01); *C10G 2300/201* (2013.01); *C10G 2300/805* (2013.01)

(58) Field of Classification Search
CPC ......... C10G 49/18; C10G 49/20; C10G 49/22; C10G 49/26; C10G 2300/201; C10G 2300/805
See application file for complete search history.

(56) References Cited

U.S. PATENT DOCUMENTS

| | | |
|---|---|---|
| 5,492,634 A | 2/1996 | Hong et al. |
| 6,066,263 A | 5/2000 | Makino et al. |
| 6,399,802 B2 | 6/2002 | Reaney |
| 6,475,396 B1 | 11/2002 | Wofford et al. |
| 6,506,308 B1 | 1/2003 | Rolf |
| 7,399,408 B2 | 7/2008 | Joussot-Dubien et al. |
| 7,691,159 B2 | 4/2010 | Li |
| 8,686,198 B2 | 4/2014 | Kalnes |
| 8,815,081 B2 | 8/2014 | Choi |
| 9,024,096 B2 | 5/2015 | Greene |
| 9,162,938 B2 | 10/2015 | Mukherjee et al. |
| 10,071,322 B2 | 9/2018 | Coppola et al. |
| 2003/0045655 A1 | 3/2003 | Hendriksen et al. |
| 2004/0129646 A1 | 7/2004 | Conaway et al. |
| 2007/0056879 A1 | 3/2007 | Euzen et al. |
| 2007/0056881 A1 | 3/2007 | Berkowitz et al. |
| 2009/0166261 A1 | 7/2009 | Li et al. |
| 2009/0166262 A1 | 7/2009 | He et al. |
| 2010/0028236 A1 | 2/2010 | Shen et al. |
| 2010/0294696 A1 | 11/2010 | Tanaka et al. |
| 2010/0300933 A1 | 12/2010 | Tanaka |
| 2011/0252696 A1 | 10/2011 | Franklin et al. |
| 2011/0315600 A1 | 12/2011 | Choi et al. |
| 2012/0073184 A1 | 3/2012 | Cranford et al. |
| 2012/0181217 A1 | 7/2012 | Choi et al. |
| 2012/0190872 A1 | 7/2012 | Cranford et al. |
| 2013/0134351 A1 | 5/2013 | Bathurst |
| 2013/0137154 A1 | 5/2013 | Reep |
| 2014/0109465 A1 | 4/2014 | Coppola et al. |
| 2014/0163272 A1 | 6/2014 | Mukherjee et al. |
| 2014/0251871 A1 | 9/2014 | Choi et al. |
| 2014/0305031 A1 | 10/2014 | Day et al. |
| 2015/0126758 A1 | 5/2015 | Elliott et al. |

(Continued)

FOREIGN PATENT DOCUMENTS

| | | |
|---|---|---|
| JP | 2002-155286 A | 5/2002 |
| WO | 2006/010068 A1 | 1/2006 |

(Continued)

OTHER PUBLICATIONS

King et al., "Hydrolysis of soybean oil in a subcritical flow reactor", Green Chemistry, 1999, p. 261-264, The Royal Society of Chemistry, Nov. 1999.

*Primary Examiner* — Randy Boyer
(74) *Attorney, Agent, or Firm* — Erise IP, P.A.

(57) ABSTRACT

A process and system for reducing contaminants contained in a contaminated feedstock comprising mixing the contaminated feedstock with water and at least one of metal scavengers or reactants, to form a feedstock-water-reactant mixture, feeding the mixture under pressure into a hydrothermal purification reactor, wherein the mixture is subject to heat, pressure, and turbulent flow conditions to cause rapid reaction of the inorganic contaminants with the metal scavengers or reactants to form inorganic salts that partition into an aqueous phase and maintaining the temperature, pressure, and turbulent flow conditions of the feedstock-water-reactant mixture for a predetermined space time to prevent the organic portion of the feedstock in the mixture from undergoing a conversion reaction and to form a hydrothermal reactor effluent; and separating the effluent into the aqueous phase containing salts of the inorganic contaminants and an organic phase that contains a lower concentration of inorganic contaminants than the contaminated feedstock.

18 Claims, 1 Drawing Sheets